United States Patent [19]

Reed et al.

[11] Patent Number: 5,209,854
[45] Date of Patent: May 11, 1993

[54] PULP WASTE COLOR REMOVAL WITH DIALLYL DIMETHYL AMMONIUM CHLORIDE COPOLYMERS

[75] Inventors: Peter E. Reed, Naperville; Chandrashekar S. Shetty, Lisle; Martha R. Finck, Countryside, all of Ill.

[73] Assignee: Nalco Chemical Company, Naperville, Ill.

[21] Appl. No.: 905,686

[22] Filed: Jun. 29, 1992

[51] Int. Cl.$^5$ .............................. C02F 1/56
[52] U.S. Cl. .................... 210/734; 210/928; 162/5
[58] Field of Search ............... 210/733, 734, 735, 908, 210/917, 928; 162/5

[56] References Cited

U.S. PATENT DOCUMENTS

| | | |
|---|---|---|
| 2,471,959 | 5/1949 | Hunt . |
| 3,414,547 | 12/1968 | Thompson et al. . |
| 4,077,930 | 3/1978 | Lim et al. .................. 210/734 |
| 4,715,962 | 12/1987 | Bhattacharyya et al. .......... 210/708 |
| 5,013,456 | 5/1991 | St. John et al. ..................... 210/735 |

Primary Examiner—Stanley S. Silverman
Assistant Examiner—Neil M. McCarthy
Attorney, Agent, or Firm—Robert A. Miller; John G. Premo

[57] ABSTRACT

Diallyl dimethyl ammonium chloride copolymers are effective in removing color from paper mill wastes when anionic vinyl monomers are used as the co-monomers.

5 Claims, 1 Drawing Sheet

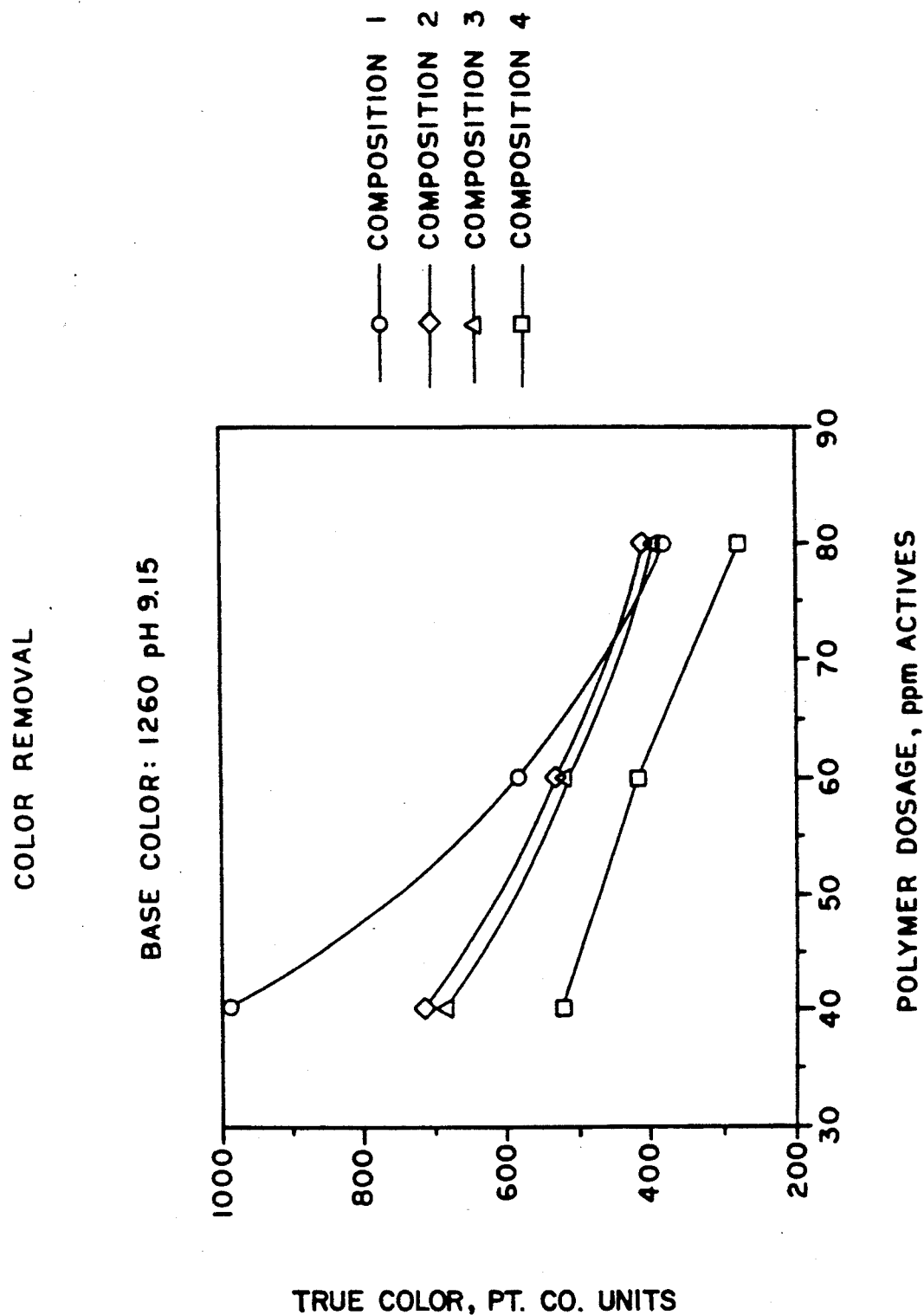

PULP WASTE COLOR REMOVAL WITH DIALLYL DIMETHYL AMMONIUM CHLORIDE COPOLYMERS

INTRODUCTION

Waste waters from pulp mills that produce bleached, chemical pulps have a characteristic black or very dark brown color, even after the waste has experienced the usual waste treatment scheme of primary clarification, aeration, and secondary clarification. The molecules which are primarily responsible for this very intense color are thought to be degraded, oxidized lignins which ar separated from the pulp primarily at the first caustic extract stage of the bleached plant. These molecules pass unchanged through the waste treatment plant because they are fairly refractory towards the biological treatment in the aeration basin. In the past, the reason to remove color from these waste waters was entirely aesthetic. Recently it has been recognized that part of this color is comprised of halogenated organics, the emphasis has therefore switched to removal of these molecules. Nevertheless, the problem remains the same. Color is not removed without removing the halogenated organics.

THE DRAWINGS

The Drawing illustrates the superiority of the copolymers of the invention as color removal coagulants.

THE INVENTION

A process of the type for decoloring pulp mill waste waters which contain color bodies by the use of a water soluble cationic coagulant in an amount sufficient to coagulate a portion of the color bodies: the improvement which comprises using as the cationic coagulant a polydiallyldimethyl ammonium chloride polymer (DADMAC) which contains from between 1-30 mole percent of an anionic vinyl monomer having an intrinsic viscosity of at least 0.5 dl./g. preferably, the intrinsic viscosity is greater than 1.

THE DADMAC COPOLYMERS

In a broad aspect of the invention these copolymers contain from 1-30 mole percent of an anionic vinyl monomer such as acrylic acid, methacrylic acid, 2-acrylamido-2-methyl propane sulfonic acid (AMPS), a Trade Mark of Lubrizol Corp., and as a preferred monomer, 3-acrylamido-3-methylbutanoic acid. When used as decolorizing coagulants for pulp mill waste waters, they preferably contain between 5-30 mole percent and most preferable 5-20 mole percent of the anionic vinyl monomer.

The polydiallyldimethyl ammonium chloride 3-acrylamido-3-methylbutanoic acid copolymers of the invention to be effective for most commercial applications should have an intrinsic viscosity of at least 0.5. A general range is 0.5-5. Most often an effective intrinsic viscosity within the range of 1 to 5.

While the copolymers of the invention are described and claimed with respect to the free acid form of the co-monomers, it is understood that they are most commonly either prepared or in the process which they are applied are converted to their alkali metal salt form. Typically the co-monomer will be in the sodium salt form, or at least a portion of the co-monomer will be converted to the sodium salt form. Ammonium and amine salts may be useful in some applications.

The polydiallyl dimethyl ammonium chloride copolymers are most conveniently prepared by a solution polymerization technique utilizing free radical catalysts, which is described more fully hereafter. When the preferred solution polymerization techniques are employed, they result in the preparation of polymer solutions having an active polymer content ranging from between about 5 to 30%. Generally the concentration will be 1% to 20%. These concentrations are convenient for purposes of transporting the polymer. They would be diluted at the point of use.

While solution polymerization using free radical catalysts is a preferred method of preparing the polymers, it is understood that they may also be prepared in the form of water-in-oil emulsions using a so called inverse emulsion polymerization technique. The method of polymerizing polydiallyl dimethyl ammonium chloride by inverse emulsion polymerization is described in detail in U.S. Pat. No. 4,715,962. With respect to this polymerization technique the disclosure of this patent is incorporated in reference.

METHOD OF PREPARING THE DADMAC COPOLYMERS

As indicated the preferred method of preparing the polydiallyl dimethyl ammonium chloride 3-acrylamido-3-methylbutanoic acid copolymers is by solution polymerization in the presence of a free radical catalyst. In order to achieve the higher intrinsic viscosities it has been found that the polymerization should be conducted in the presence of about 5 to 20 percent or more by weight of sodium chloride based on monomer.

This polymerization scheme is described in U.S. application Ser. No. 07/871,300, filed Apr. 20, 1992, entitled, *Process of Polymerizing Diallyldialkyl Ammonium Compounds to Produce Higher Molecular Weight Polymers*. The disclosure of this application is incorporated herein by reference.

When amounts exceeding about 5 mole percent of the co-monomer are copolymerized with diallyldimethyl ammonium chloride it is beneficial that the co-monomer be slowly added to the diallyldimethyl ammonium chloride solution over a period of time if the reactivity ratio between the two monomers is not equal. A preparative technique used in preparing the polydiallyl dimethyl ammonium chloride 3-acrylamido-3-methylbutanoic acid copolymers is set forth hereafter as Examples 1-4.

GENERAL SYNTHETIC PROCEDURE

1. The polymerization mixture is prepared by adding a solution of diallyl dimethyl ammonium chloride, sodium chloride, deionized water, the tertrasodium salt of ethylenediamine tetraacetic acid (EDTA) and a portion of the co-monomer into a reaction vessel equipped with a stirrer, nitrogen inlet, condenser, heater, and thermometer.

2. The polymerization mixture is then heated, purged with nitrogen, and maintained at a specific temperature falling within the range between 40°-90° C.

3. A free radical initiator solution is then slowly added over a 16 hr. period. During this period, an aqueous solution of the remaining co-monomer is added to the polymerization mixture. Optionally, up to 35% (based on monomer solids) deionized water may also be added during this period.

4. After a period of time sufficient to allow conversion of the diallyl dimethyl ammonium chloride monomer to exceed 80% the final initiator solution is added and the temperature is raised (if necessary) to between 80°–90° C. for a period of time sufficient to raise the conversion to greater than 90%.

5. The reaction mixture is then diluted with an amount of deionized water sufficient to bring the polymer concentration to between 10–40 wt %.

EXAMPLE 1

| Solution of a 14 mole % AMBA Copolymer | |
|---|---|
| 67% DADMAC monomer solution | 250 gm |
| Sodium chloride | 30.5 gm |
| Deionized water | 18.5 gm |
| EDTA | 0.05 gm |
| AMBA | 14.0 gm |
| 3.6% VAZO-50* solution | 51.9 gm |
| 10.7% AMBA solution | 140 gm |
| 1.5% VAZO-50 solution | 127 gm |
| Deionized water | 678 gm |

*Azo catalyst

EXAMPLE 2

| Solution of a 7 mole % AMPS Compolymer | |
|---|---|
| DADMAC monomer solution | 250 gm |
| Sodium chloride | 30.5 gm |
| Deionized water | 13.0 gm |
| EDTA | 0.05 gm |
| 50% sodium AMPS solution | 11.1 gm |
| 3.5% VAZO-50* solution | 51.9 gm |
| 8.55% sodium AMPS solution | 150.8 gm |
| 1.8% VAZO-50 solution | 101.8 gm |
| Deionized water | 631 gm |

*Azo catalyst

EXAMPLE 3

| Solution of a 10 mole % Acrylic Acid | |
|---|---|
| 67% DADMAC monomer solution | 250 gm |
| Sodium chloride | 30.5 gm |
| Deionized water | 18.5 gm |
| EDTA | 0.05 gm |
| Acrylic acid | 2.5 gm |
| 3.5% VAZO-50* solution | 51.9 gm |
| 10.3% acrylic acid solution | 55.8 gm |
| 1.8% VAZO-50 solution | 101.8 gm |
| Deionized water | 661 gm |

*Azo catalyst

EVALUATION OF DADMAC COPOLYMERS AS DEINKING COMPOSITIONS

Dosage

The general polymers is between 0.5–100 parts per million (ppm), based on the weight of the decolorizing process waters. A preferred dosage range is 5–100 ppm with a most preferred range being 30–80 ppm. It is understood that routine experimentation in any particular case will be required to ascertain the optimum dosage.

Test Method

The samples tested were taken from a paper mill located in the southern portion of the United States.

True color was measured in accordance with the method, National Council of Air and Stream Improvement (NCASI), Technical Bulletin No. 253, "An Investigation of Improved Procedure for Measurement of Mill Effluent and Receiving Water Color", December, 1971, which is universally used in the paper industry. The method entails adjusting the pH of the wastewater to 7.6 then filtering through an 0.8 micrometer membrane filter. The absorbance of the filtrate is measured in a spectrophotometer at a wavelength of 465 nm. The absorbance is compared to a calibration curve with standard color solutions to determine the numerical value in Pt-Co units.

Using the above described test method two compositions of the invention were tested and compared against two other polymers.

COMPOSITIONS EVALUATED

Composition 4 is a polydiallyl dimethyl ammonium chloride/7 mole % AMBA copolymer.

Composition 3 is the polydiallyl dimethyl ammonium chloride 7 mole % AMPS polymer of Example 2.

Composition 2 is a polydiallyl dimethyl ammonium chloride/10% acrylic acid copolymer of Example 3.

Composition 1 is a commercial epichlorohydrin-dimethyalmine copolymer which has been used commercially in decolorization of paper mill waste streams. The results of the tests are set forth in the Drawing.

We claim:

1. A process for decoloring pulp mill waste waters by the use of a water soluble cationic coagulant in an amount sufficient to coagulate a portion of the color: the improvement which comprises using as the cationic coagulant a polydiallyl dimethyl ammonium chloride which contains from between 1–30 mole percent of an anionic vinyl co-monomer from the group consisting of 3-acrylamido-3-methylbutanoic acid and 2-acrylamido-2-methyl propane sulfonic acid and has an intrinsic viscosity of at least 0.5.

2. The process of claim 1 where the copolymer contains between 5–30 mole percent of the anionic vinyl comonomer and has an intrinsic viscosity within the range of between 0.5–5.

3. The process of claim 1 where the copolymer contains between 5–20 mole percent of the anionic vinyl comonomer and has an intrinsic viscosity within the range of between 1–5.

4. A process for decoloring pulp mill waste waters by the use of a water soluble cationic coagulant in an amount sufficient to coagulate a portion of the color: the improvement which comprises using as the cationic coagulant a polydiallyl dimethyl ammonium chloride which contains from between 1–30 mole percent of 3-acrylamido-3-methylbutanoic acid and has an intrinsic viscosity of at least 0.5

5. A process for decoloring pulp mill waste waters by the use of a water soluble cationic coagulant in an amount sufficient to coagulate a portion of the color: the improvement which comprises using as the cationic coagulant a polydiallyl dimethyl ammonium chloride which contains from between 1–30 mole percent of 2-acrylamido 2-methyl propane sulfonic acid and has an intrinsic viscosity of at least 0.5.

* * * * *